Feb. 28, 1939.　　　H. FREEDMAN　　　2,149,048

ARTIFICIAL DENTAL STRUCTURE

Filed Jan. 6, 1937

INVENTOR.
HYMAN FREEDMAN
BY
ATTORNEYS

Patented Feb. 28, 1939

2,149,048

UNITED STATES PATENT OFFICE 2,149,048

ARTIFICIAL DENTAL STRUCTURE

Hyman Freedman, Brooklyn, N. Y.

Application January 6, 1937, Serial No. 119,175

7 Claims. (Cl. 32—2)

This invention relates to improvements in masticating apparatus and has for one of its objects to increase the retentiveness of an artificial denture with respect to the ridge of the mouth on which it is mounted, by utilizing a magnetic material in the structure in such a manner that opposed portions thereof, at least one of which contains said material, will act one upon the other to assist in the maintenance of said denture in its operative position.

The inventive idea involved is capable of receiving a variety of mechanical expressions some of which, for purposes of illustration, are shown in the accompanying drawing, wherein.

In carrying out the invention, it is proposed to employ, as the magnetizable material used in the manufacture of the dental structure, an alloy consisting of aluminum, nickel, cobalt and iron, such as described in United States Patents Nos. 1,947,274, dated February 13, 1934; 1,968,569, dated July 31, 1934; and 1,989,551, dated January 29, 1935. This alloy is especially suitable for the purpose intended, primarily because of its exceedingly high point of magnetic saturation, the ability to retain its magnetism, and its capability of being used in smaller volume than any other known magnet material; also, the fact that the alloy is non-corrosive lends itself admirably for use in a dental structure.

Figure 1:
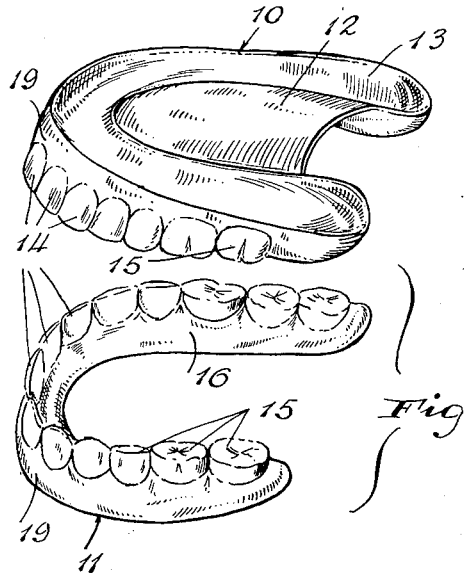
Figure 1 is a perspective view of the upper and lower dental plates of a masticating apparatus showing the invention applied thereto.
Figure 2:
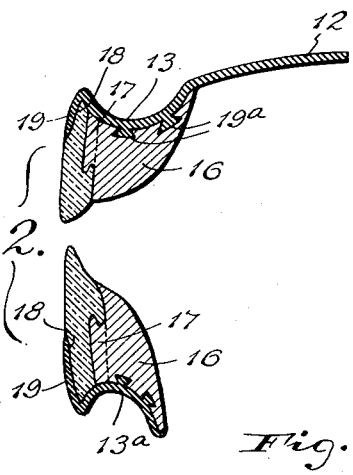
Figure 2 is a fragmentary vertical longitudinal section through the two plates.
Figure 3:
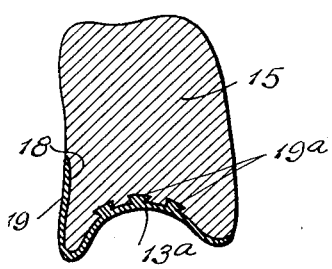
Figure 3 is a transverse section taken through one of the posterior teeth of the denture, such as a molar.

By reference to Figures 1 to 3, in which there is illustrated one form of adaptation, the numerals 10 and 11 indicate generally the upper and lower dentures of a complete masticasting apparatus. The formation of these dentures, including the molding of the plates and the assembly of the artificial facings thereon, may be accomplished by following any preferred technique well known in the art. Thus, the plate of the upper denture 10 comprises the usual palatal portion 12 merging at its margin into the base or cavo surface 13 which receives the ridge of the upper bone structure of the mouth when the denture is in operative position. Said palatal portion and base are preferably made of vulcanized rubber, colored in the customary manner to impart a natural appearance to said portions of the plate. This is also true of the base 13a of the lower denture. The artificial teeth or facings of the two dentures comprise the usual types which may be, for purposes of this description, grouped as the anterior and posterior facings 14 and 15, respectively. A backing is provided for the teeth of each denture and, in accordance with the present invention, this backing 16 is formed of the magnetizable alloy above mentioned, although it will be appreciated that one of the backings could be of such metal and the other of some other magnetizable material. In the form being described, some of the posterior teeth 15 of both plates may also be cast in their entirety from said metal, as shown in Figure 3, while the anterior facings 14 may be of porcelain, as is customary. The backing may be provided with the usual posts 17, or special backings may be employed, on which the removable facings of the dentures are mounted, and these facings may be of the standard Steele construction, if desired. The labial aspects of the teeth may be slightly recessed, as indicated at 18, to receive the veneer portions 19 of vulcanized rubber, colored to resemble the gums. If desired, the backings 16 and those teeth such as shown in the Figures 3 and 4 which are made essentially of the magnetized material, may be recessed as indicated at 19a to receive some of the vulcanized rubber of the bases of the dentures so as to more securely connect the two elements.

Upon completion of the dentures, the alloy in each of them is magnetized so that, for example, the posterior extremities will receive one polarity while the anterior portion thereof is of the opposite polarity. In this manner, when the two dentures are in operative position, opposed portions, such as the anteriors and posteriors, will be of like polarity and hence will repel each other to thereby materially assist in maintaining the dentures on the ridges of the mouth and thus overcome to a large extent the annoyances to which patients are subjected who are compelled to use this type of dentures.

Figure 4:
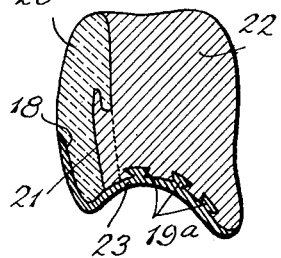
Figure 4 is a view similar to Figure 3 showing a different form of molar.

In Figure 4, there is illustrated a slightly modified form of a posterior tooth such as a molar wherein, instead of making the entire tooth of metal as in Figure 3, a porcelain facing 20, preferably of standard make, is supported upon a post 21 carried by the backing 22 which comprises the remainder of the tooth and is made of the magnetized alloy above referred to, with the base of the tooth and its lingual aspect lined with a layer 23 of vulcanized rubber forming the cavo surface of the tooth.

Figure 5:
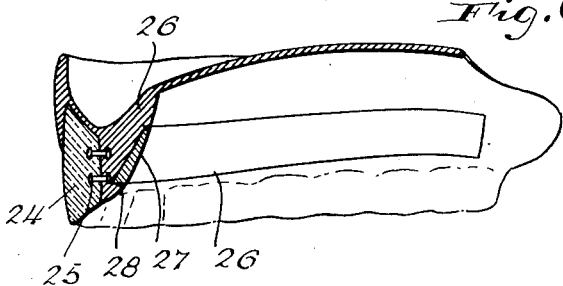
Figure 5 is a vertical longitudinal section through a dental plate of standard type, showing another form of the invention applied thereto.
Figure 6:
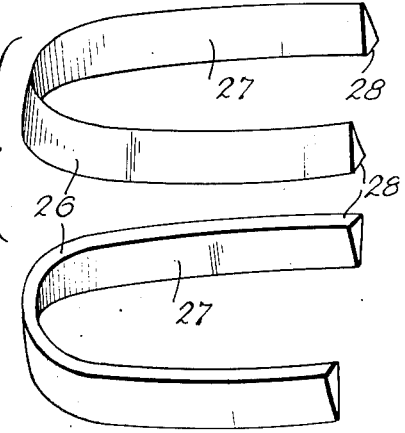
Figure 6 is a perspective view of the two magnetized elements employed in the upper and lower dentures of an apparatus such as shown in Figure 5.

Figures 5 and 6 show a further modified form in which the two dentures, the upper one of which is illustrated in Figure 5, can be made in the customary manner with the usual facings 24 secured by pins 25, or other suitable instrumentalities in the rubber plate 26. In such instance, the present inventive idea is carried out by mounting in the lingual portion of each plate during the molding thereof, a bar 26 of said alloy magnetized in the same manner as described in connection with the dentures of Figure 1. Each bar is of general horseshoe formation and is arched to conform generally to the contour of the lingual portion of the plate, and may be entirely embedded therein or countersunk so that its outer surface 27 is exposed, as shown in Figure 5. In the latter instance, said surface is inclined relative to the vertical and shaped to conform as nearly as possible to the contour of the lingual surface of the plate. Also, each bar is made triangular in cross section with the base 28 disposed nearest the teeth so that the broadest possible area will be submitted to the magnetic influence of the bar in the other denture. In the present form, the two bars which comprise the magnetic fields working in opposition to each other, are spaced apart more than in the instance when the backings 16 and the occlusal surfaces of the teeth consist of the alloy. However, the magnetic quality of the alloy is such that, notwithstanding the distance between the two bars when the dentures are in position, a sufficient counteracting magnetic influence will be created between the bars to materially assist in maintaining the dentures in proper position.

Figure 7:
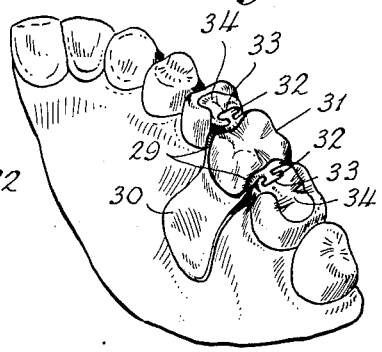
Figure 7 is a perspective view of another form of the invention in which the same is applied to a removable bridgework.

In Figure 7, the invention is shown in its application to a removable bridgework of more or less standard type. The bridge generally indicated by the numeral 29 includes the usual saddle 30 in which the artificial tooth 31 is mounted, and disposed on opposite sides of said bridge are the posts or male members 32. These latter members are adapted to fit in the recesses 33 of the inlays 34 secured to the permanent teeth. In the ordinary construction of this type of bridgework, reliance is placed upon the frictional contact between the posts 32 and the walls of the recesses 33 in order to maintain the bridgework in position. In accordance with the present invention, it is proposed to materially increase the retentiveness of the structure by making the bridge 29, which is molded of one piece, of the magnetized alloy. When this has been done the material may be magnetized so that the two opposed portions including the posts 32 have opposite polarities. The inlays 34 may also be made of the alloy mentioned or of any other magnetized material. Thus, with the bridge in position the magnetic fields at the two side extremities of the bridge will be attracted to the metal of the inlays and by this magnetism the bridge will be more securely held in position against the ridge of the mouth.

What is claimed is:

1. As a new article of manufacture, an artificial dental structure comprising two cooperating members having, at least, portions thereof magnetized to a high degree of saturation so that one will act upon the other to maintain the latter in operative position on the ridge of the mouth.

2. As a new article of manufacture, an artificial dental structure comprising two cooperating members each, at least partially, formed from a non-corrosive magnetized alloy, and one exerting a force upon the other to maintain the latter in operative position on the ridge of the mouth.

3. As a new article of manufacture, a pair of artificial dentures made, at least partially, of magnetized material opposed portions of which in the two dentures are of like polarity.

4. As a new article of manufacture, a pair of artificial dentures, the plates of which are at least partially made of a magnetized alloy, with the opposed posterior extremities of both plates of one polarity and the opposed anterior portions of said plates of another polarity.

5. As a new article of manufacture, a pair of artificial dentures each comprising a plurality of facings backed by a magnetized alloy having a high degree of saturation, with different portions of said alloy in each denture being of unlike polarities and the corresponding portions in the two dentures opposed in each other being of like polarities.

6. As a new article of manufacture, a pair of artificial dentures comprising upper and lower plates each having a plurality of facings mounted therein certain of which are made of porcelain provided with a backing of magnetized alloy, and other teeth of the plate being made wholly of said alloy, the opposed portions of said alloy in the two dentures being of like polarity.

7. As a new article of manufacture, a pair of artificial dentures each comprising a plurality of facings, a backing therefor, and a magnetized bar mounted in said backing, opposed portions of the bars in the backings of the two dentures being of like polarity.

HYMAN FREEDMAN.